R. C. SANDERS.
LAWN SPRINKLER.
APPLICATION FILED SEPT. 24, 1907.
912,493.
Patented Feb. 16, 1909.
2 SHEETS—SHEET 1.
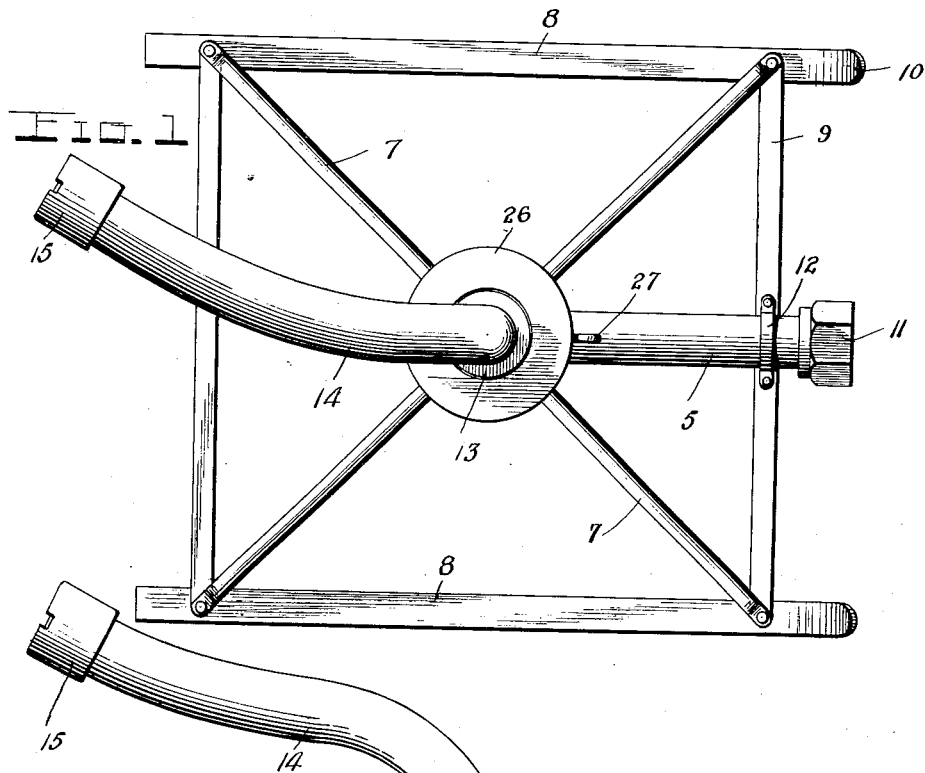
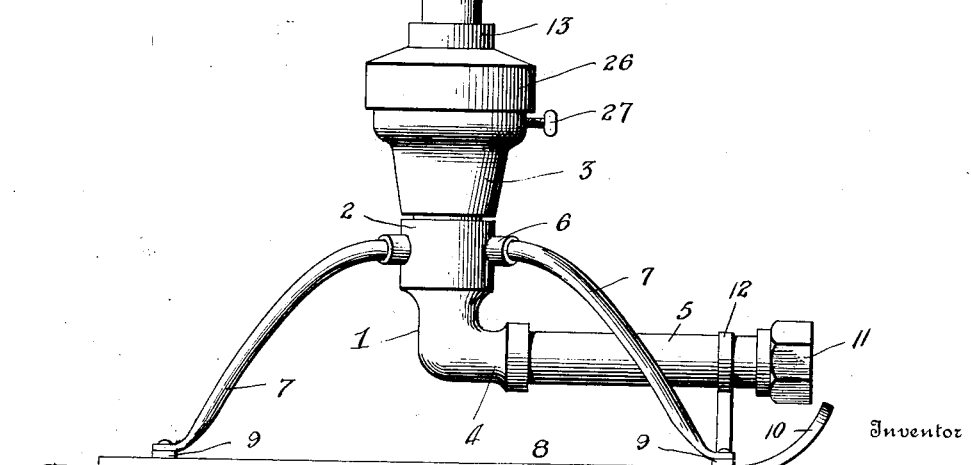

R. C. SANDERS.
LAWN SPRINKLER.
APPLICATION FILED SEPT. 24, 1907.
912,493.
Patented Feb. 16, 1909.
2 SHEETS—SHEET 2.
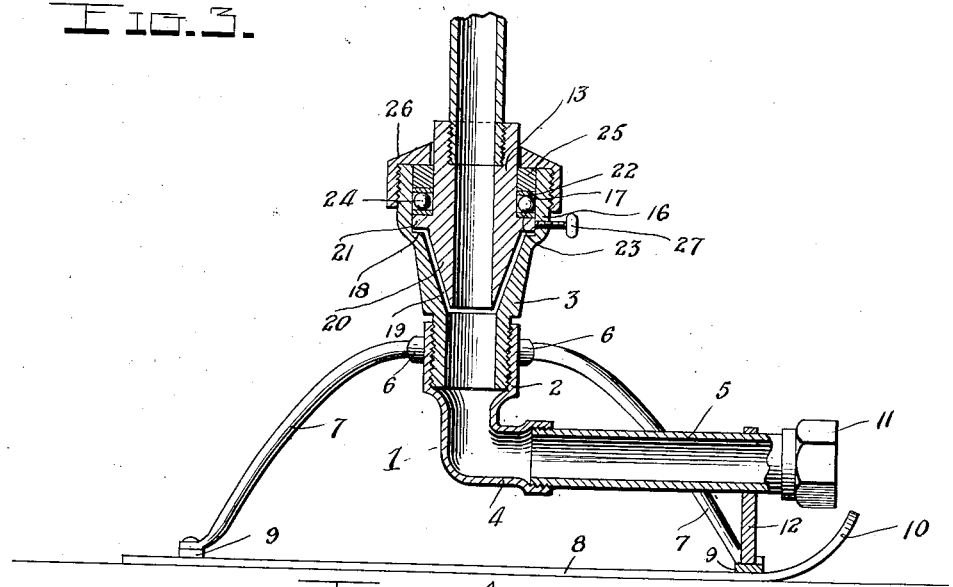
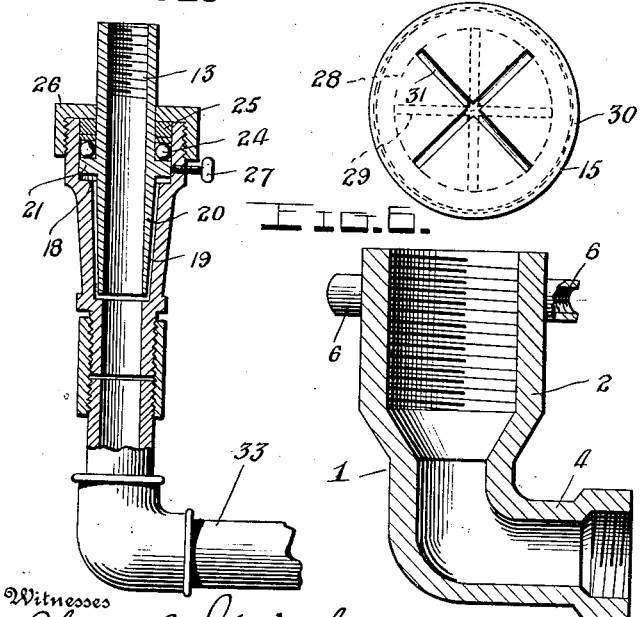
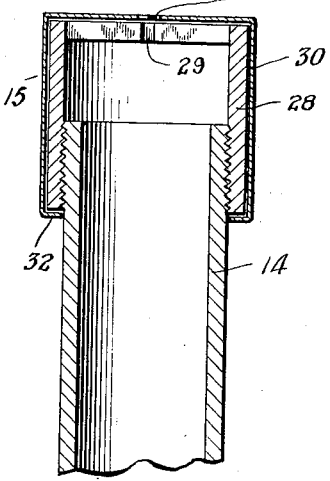
Witnesses
Chas. L. Griesbauer.
E. Rousseau.
Inventor
Russell C. Sanders
By Watson E. Coleman
Attorneys

//UNITED STATES PATENT OFFICE.

RUSSELL C. SANDERS, OF PIERRE, SOUTH DAKOTA.

LAWN-SPRINKLER.

No. 912,493.　　　　Specification of Letters Patent.　　　　Patented Feb. 16, 1909.

Application filed September 24, 1907. Serial No. 394,289.

*To all whom it may concern:*

Be it known that I, RUSSELL C. SANDERS, a citizen of the United States, residing at Pierre, in the county of Hughes and State of South Dakota, have invented certain new and useful Improvements in Lawn-Sprinklers, of which the following is a specification, reference being had to the accompanying drawings.

My invention relates to improvements in sprinkling or spraying devices especially designed for use upon lawns and for attachment to a hose.

One object of the invention is to provide a lawn sprinkler or sprayer which may be readily moved about the lawn by pulling upon the hose attached to it and which will have a revolving discharge pipe to cause water to be sprayed over a large area.

Another object of the invention is to provide a sprinkling or spraying device of this character having its revolving discharge pipe mounted in ball bearings so that it will be easy running, and also provided with means whereby its speed may be readily controlled.

A further object of the invention is to provide an improved nozzle for the discharge pipe whereby the size and shape of the spray may be varied.

With the above and other objects in view, the invention consists of the novel features of construction and the combination and arrangement of parts hereinafter described and claimed and illustrated in the accompanying drawings in which—

Figure 1 is a top plan view of my improved lawn sprinkler; Fig. 2 is a side elevation of the same; Fig. 3 is a vertical longitudinal section; Figs. 4 and 5 are detailed view of the discharge nozzle; Fig. 6 is a detailed view of the base or body; and Fig. 7 is a detailed view of a slight modification.

My improved lawn sprinkler or sprayer comprises a base or body member 1 of right angular form having a vertical branch 2 to which is connected a stationary head 3 and also having a horizontal branch 4 to which is connected a hose pipe 5. As shown in Fig. 6 this base member 1 is in the form of an elbow connection and has the pipe 5 screwed into its small branch 4 and the head or sleeve 3 screwed into its large end or branch 2. Formed upon the exterior of said end 2 are bosses 6 having threaded sockets to receive the upper ends of the supporting legs 7, the lower ends of which are connected to parallel runners 8. The supporting legs 7 are preferably four in number and they are curved longitudinally and extend downwardly and outwardly, two being attached to each runner at points adjacent to its opposite ends. The runners 8 are connected by cross bars 9 which serve to brace the parts 7, 8 and provide an effective supporting frame or sled for the device. The front ends of the runners 8 are upturned as shown at 9 so that the frame or sled may be readily drawn over the lawn by the hose attached to the pipe 5. The latter has at its outer end the usual coupling connection 11 to receive the hose, and said end is supported by an upright member 12 having a loop or ring at its upper end to receive the pipe, and outwardly projecting feet at its lower end for attachment to the front cross bar.

The stationary head 3 forms a casing and support for a revolving head 13 carrying a curved discharge pipe 14 on the outer end of which is a nozzle 15. The head or casing 3 has at its lower end a reduced portion externally threaded to enter the body 1, and at its upper end an enlarged portion 16 containing an enlarged bore 17 and a shoulder 18. Bore 17 is of greater diameter than the bore or opening 19 in the lower portion of the head 3, which bore 19 is preferably tapered as shown in Fig. 3. The revolving head 13 has a tapered lower end 20 to enter the portion 19 of the bore of the head 3 and an annular flange 21 to engage the shoulder 18. The upper end of the head 13 is internally screw threaded to receive the pipe 14. Arranged in the bore 17 above the flange 21, and between two rings or washers 22, 23 of rust proof material, is an annular series of bearing balls 24. Also arranged in the bore 17 above the upper washer 22 is a packing 25 of any suitable material. This packing is held in position and the head 13 is retained in the head 3 by a screw cap 26 threaded upon the upper end of the head 3 and having a central aperture in which the head 13 may freely rotate. It will be seen that the provision of the ball bearings takes up the end thrust on the revolving head 13 and reduces friction so that as the water passes out of the discharge pipe 14 said head may freely revolve. In order to control the speed of the same I provide a set screw 27 which is arranged in a threaded aperture in the enlarged portion 16 of the stationary head 3 and is adapted to have its inner end frictionally engaged to the outer edge of the flange 21.

The nozzle 15 comprises an inner member 28 in the form of a screw cap which is threaded upon the upper end of the pipe 14 and has in its top transverse intersecting slots 29. Mounted for rotation upon the cap or pipe 28 is a sleeve 30 which also has similar intersecting slots 31 adapted to register with portions of the slots 29 to permit of the outlet of the water. By rotating the sleeve 31 upon the cap or head 28, different portions of the slots or openings 29 will be uncovered so that the size and shape of the spray may be varied. The sleeve 30 is preferably retained upon the head 28 by turning the edge of the lower open end to said sleeve inwardly against the inner or lower end of the head 28 as shown at 32.

The device may be employed in a fountain or may be mounted stationary. In Fig. 7 I have shown head 3 connected to a stationary stand pipe 33, but it may be mounted in any other suitable manner.

In the foregoing it will be seen that when a stream of water passes through the device the pressure of the water will push the curved pipe 14 in the direction opposite to that in which the stream is thrown from the nozzle 15 and said pipe will therefore revolve upon the ball bearings in the head or casing 3. Owing to the peculiar construction of the parts it will be seen that they may be readily adjusted so that the pipe 14 may revolve at any desired speed. It will be further noted that the device is simple and durable in construction and therefore may be produced at a comparatively small cost. Owing to the provision of the runners 8 with their upturned ends 10, the device may be readily drawn over the lawn, while the water is turned on, by simply pulling it by means of the hose.

Having thus described my invention, what I claim is:

1. A lawn sprinkler, comprising a right angular body having vertical and horizontal branches, the vertical branch being provided with radiating nipples having threaded sockets, curved legs screwed into said sockets, cross bars uniting said legs, runners uniting said cross bars and formed with upturned ends, an upright bearing bracket upon the cross bar at the upturned ends of said runners, a hose pipe arranged in said bearing bracket and connected to the horizontal branch of the body, a stationary head upon the vertical branch of said body, a rotary head in said stationary head and a curved discharge pipe or nozzle carried by said rotary head, substantially as set forth.

2. A lawn sprinkler, comprising a right angular body having vertical and horizontal branches, the upper branch being internally screw threaded, a hose pipe connected to the horizontal branch, a supporting frame for said body, a stationary head screwed into the vertical branch of the body and formed with a longitudinal bore, the upper part of the latter being enlarged to provide an annular seat or shoulder, the extreme upper end of said head being externally screw threaded, a rotary head having a longitudinal bore and formed with a lower reduced end and at a point intermediate its ends with an annular flange to enter the enlarged upper portion of the bore of the stationary head, an annular row of bearing balls in the stationary head above said flange, washers arranged in the stationary head above and below said balls, a packing in said stationary head above the uppermost washer, a screw cap engaged with the threaded upper end of the stationary head for retaining the packing in the latter and a curved discharge pipe or nozzle projecting from said rotary head, substantially as set forth.

3. A lawn sprinkler comprising a discharge pipe having an externally screw threaded end, a cylindrical nozzle cap having its closed outer end formed with intersecting slots and its open inner end internally threaded to engage the threaded end of said pipe, and a cylindrical regulating sleeve revolubly mounted upon the nozzle cap and formed in its outer end with intersecting slots adapted to register with those in the nozzle cap, said sleeve being of greater length than the nozzle cap and having the edge of its open inner end bent or crimped inwardly into engagement with the inner end of the same to retain the sleeve upon it.

4. A lawn sprinkler comprising a body, a discharge nozzle carried thereby, a hose pipe projecting horizontally from the body, supporting feet connected to the body and radiating therefrom, cross bars between said feet, parallel runners uniting the ends of said cross bars and having upturned ends, and a brace bracket between said hose pipe and the bar adjacent to the upturned ends of the runners, substantially as and for the purpose set forth.

In testimony whereof I hereunto affix my signature in the presence of two witnesses.

RUSSELL C. SANDERS.

Witnesses:
M. P. GOODNER,
TOM C. MCNAMEE.